United States Patent
Zhang et al.

(10) Patent No.: US 10,200,700 B2
(45) Date of Patent: Feb. 5, 2019

(54) CROSS-COMPONENT PREDICTION IN VIDEO CODING

(71) Applicant: QUALCOMM Incorporated, San Diego, CA (US)

(72) Inventors: Li Zhang, San Diego, CA (US); Marta Karczewicz, San Diego, CA (US); Jianle Chen, San Diego, CA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 14/743,804

(22) Filed: Jun. 18, 2015

(65) Prior Publication Data

US 2015/0373349 A1 Dec. 24, 2015

Related U.S. Application Data

(60) Provisional application No. 62/015,301, filed on Jun. 20, 2014.

(51) Int. Cl.
*H04N 19/13* (2014.01)
*H04N 19/14* (2014.01)
(Continued)

(52) U.S. Cl.
CPC ......... *H04N 19/196* (2014.11); *H04N 19/105* (2014.11); *H04N 19/13* (2014.11);
(Continued)

(58) Field of Classification Search
USPC .................................................. 375/240.02
See application file for complete search history.

(56) References Cited

U.S. PATENT DOCUMENTS

| 2015/0117519 | A1  | 4/2015 | Kim et al. |
| 2016/0029035 | A1* | 1/2016 | Nguyen ............... H04N 19/597 375/240.12 |

OTHER PUBLICATIONS

Lai, et al.(Lai, et al., "Description of Screen Content Coding Technology Proposal by MediaTek," JCT-VC Meeting; Mar. 27-Apr. 4, 2014; Valencia; (Joint Collaborative Team on Video Coding of ISO/IEC JTC1/SC29/WG11 and ITU-T SG.16); URL: Http://WFTP3. ITU.INT/AV-ARCH/JCTVC-SITE/, No. JCTVC-Q0033-v4, Mar. 26, 2014, XP030115920, 31 pp.).*

(Continued)

*Primary Examiner* — Behrooz M Senfi
*Assistant Examiner* — Ana Picon-Feliciano
(74) *Attorney, Agent, or Firm* — Shumaker & Sieffert, P.A.

(57) ABSTRACT

A system and method for decoding video. A first syntax element for a block of video data is received, a value of the first syntax element indicating one of a plurality of mapping functions to be used to determine a magnitude of a scaling parameter for cross-component prediction. A second syntax element for the block of video data is received, a value of the second syntax element corresponding to the magnitude of the scaling parameter, wherein receiving the second syntax element includes decoding the value of the second syntax element with a specific binarization method. The magnitude of the scaling parameter is determined using the one of the plurality of mapping functions indicated by the first syntax element and the value of the second syntax element. Cross-component prediction is performed for at least one component of the block video data using the determined magnitude of the scaling parameter.

35 Claims, 10 Drawing Sheets

(51) Int. Cl.
H04N 19/70 (2014.01)
H04N 19/105 (2014.01)
H04N 19/176 (2014.01)
H04N 19/186 (2014.01)
H04N 19/196 (2014.01)
H04N 19/463 (2014.01)
H04N 19/593 (2014.01)

(52) U.S. Cl.
CPC ........... H04N 19/14 (2014.11); H04N 19/176 (2014.11); H04N 19/463 (2014.11); H04N 19/593 (2014.11); H04N 19/70 (2014.11); H04N 19/186 (2014.11)

(56) References Cited

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Itu-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Lai, et al., "Description of Screen Content Coding Technology Proposal by MediaTek," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0033-v4, Mar. 26, 2014, XP030115920, 31 pp.

Zhang, et al., "AHG5 and AHG8: Alpha parameter coding methods for inter-component residual prediction in HEVC range extension," JCT-VC Meeting; Jan. 11-17, 2014; Valencia; (Joint Collaborative Team on Video Coding of ISO/IEC JTC1/SC29/WG11 and ITU-T SG.16); Jan. 4, 2014; No. JCTVC-P0154_r1, 5 pp.

Flynn, et al., "High Efficiency Video Coding (HEVC) Range Extensions text specification: Draft 7," JCT-VC Meeting; Mar. 27-Apr. 4, 2014; Valencia; (Joint Collaborative Team on Video Coding of ISO/IEC JTC1/SC29/WG11 and ITU-T SG.16); No. JCTVC-Q1005_v4, Apr. 10, 2014; 376 pp.

Flynn, et al., "High Efficiency Video Coding (HEVC) Range Extensions text specification: Draft 7," JCT-VC Meeting; Mar. 27-Apr. 4, 2014; Valencia; (Joint Collaborative Team on Video Coding of ISO/IEC JTC1/SC29/WG11 and ITU-T SG.16); No. JCTVC-Q1005_v8, Jun. 17, 2014; 363 pp.

Sole, et al., "HEVC Screen Content Coding Core Experiment 1 (SCCE1): Intra Block Copying Extensions," JCT-VC Meeting; Mar. 27-Apr. 4, 2014; Valencia; (Joint Collaborative Team on Video Coding of ISO/IEC JTC1/SC29/WG11 and ITU-T SG.16); No. JCTVC-Q1121, Apr. 18, 2014; 5 pp.

Pu, et al., "RCE1: Descriptions and Results for Experiments 1, 2, 3, and 4," JCT-VC Meeting; Oct. 25-Nov. 1, 2013; Valencia; (Joint Collaborative Team on Video Coding of ISO/IEC JTC1/SC29/WG11 and ITU-T SG.16); No. JCTVC-O0202, Oct. 15, 2013; 9 pp.

Wang, et al., "High Efficiency Video Coding (HEVC) Defect Report 4," JCT-VC Meeting; Mar. 27-Apr. 4, 2014; Valencia; (Joint Collaborative Team on Video Coding of ISO/IEC JTC1/SC29/WG11 and ITU-T SG.16); No. JCTVC-Q1003 (v.1), May 28, 2014; 314 pp.

International Search Report and Written Opinion from International Application No. PCT/US2015/036760, dated Sep. 4, 2015, 11 pp.

Response to Written Opinion dated Sep. 4, 2015, from International Application No. PCT/US2015/036760, filed on Feb. 12, 2016, 6 pp.

Joshi, et al., "High Efficiency Video Coding (HEVC) Screen Content Coding: Draft 3," JCT Meeting; Feb. 10-17, 2015; (Joint Collaborative Team on Video Coding of ISO/IEC JTC1/SC29/WG11 and ITU-T SG.16); No. JCTVC-T1005; Apr. 5, 2015; 567 pp.

Second Written Opinion from International Application No. PCT/US2015/036760, dated May 11, 2016, 6 pp.

Response to Written Opinion dated May 11, 2016, from International Application No. PCT/US2015/036760, filed on Jul. 8, 2016, 26 pp.

International Preliminary Report on Patentability from International Application No. PCT/US2015/036760, dated Jul. 29, 2016, 6 pp.

* cited by examiner

| idx | 0 | 1 | 2 | 3 | 4 |
|---|---|---|---|---|---|
| Set 0 | 0 | 1 | 2 | 4 | 8 |
| Set 1 | 0 | 8 | 4 | 2 | 1 |

FIG. 10A

| Sign,idx | 0,0 | 0,1 | 0,2 | 0,3 | 0,4 | 1,1 | 1,2 | 1,3 | 1,4 |
|---|---|---|---|---|---|---|---|---|---|
| Set 0 | 0 | 1 | 2 | 4 | 8 | -1 | -2 | -4 | -8 |
| Set 1 | 0 | 8 | 4 | 2 | 1 | -8 | -4 | -2 | -1 |
| Set 2 | 0 | 16 | 8 | 4 | 2 | -16 | -8 | -4 | -2 |

FIG. 10B

| Sign,idx | 0,0 | 0,1 | 0,2 | 0,3 | 0,4 | 1,1 | 1,2 | 1,3 | 1,4 |
|---|---|---|---|---|---|---|---|---|---|
| Set 0 | 0 | 1 | 2 | 4 | 8 | -1 | -2 | -4 | -8 |
| Set 1 | 0 | -8 | -4 | -2 | -1 | 8 | 4 | 2 | 1 |
| Set 2 | 0 | 16 | 8 | 4 | 2 | -16 | -8 | -4 | -2 |

FIG. 10C

CROSS-COMPONENT PREDICTION IN VIDEO CODING

This application claims the benefit of U.S. Provisional Application No. 62/015,301, filed Jun. 20, 2014, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4. ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to inter-color component residual prediction. The techniques of this disclosure may be used for predicting a block of residual chroma samples based at least in part on a block of luma residual samples.

In one example, a method of decoding video data includes receiving a first syntax element for a block of video data, a value of the first syntax element indicating one of a plurality of mapping functions to be used to determine a magnitude of a scaling parameter for cross-component prediction; receiving a second syntax element for the block of video data, a value of the second syntax element corresponding to the magnitude of the scaling parameter; wherein receiving a second syntax element includes decoding the value of the second syntax element with a specific binarization method regardless of the value of the first syntax element, determining the magnitude of the scaling parameter from a set of scaling parameter values using the one of the plurality of mapping functions indicated by the first syntax element and the value of the second syntax element; and performing cross-component prediction for at least one chroma component of the block video data using the determined magnitude of the scaling parameter.

In another example, a destination device 14 includes memory configured to store video data and a video decoder connected to the memory. The video decoder is configured to receive a first syntax element for a block of the video data, a value of the first syntax element indicating one of a plurality of mapping functions to be used to determine a magnitude of a scaling parameter for cross-component prediction; receive a second syntax element for the block of video data, a value of the second syntax element corresponding to the magnitude of the scaling parameter, wherein receiving a second syntax element includes decoding the value of the second syntax element with a specific binarization method regardless of the value of the first syntax element; determine the magnitude of the scaling parameter from a set of scaling parameter values using the one of the plurality of mapping functions indicated by the first syntax element and the value of the second syntax element; and perform cross-component prediction for at least one chroma component of the block video data using the determined magnitude of the scaling parameter.

In another example, a video decoder includes means for receiving a first syntax element for a block of video data, a value of the first syntax element indicating one of a plurality of mapping functions to be used to determine a magnitude of a scaling parameter for cross-component prediction; means for receiving a second syntax element for the block of video data, a value of the second syntax element corresponding to the magnitude of the scaling parameter, wherein the means for receiving a second syntax element includes means for decoding the value of the second syntax element with a specific binarization method regardless of the value of the first syntax element; means for determining the magnitude of the scaling parameter from a set of scaling parameter values using the one of the plurality of mapping functions indicated by the first syntax element and the value of the second syntax element; and means for performing cross-component prediction for at least one chroma component of the block video data using the determined magnitude of the scaling parameter.

In yet another example, method of encoding a block of video data includes determining a scaling parameter for cross-component prediction of a block of video data; selecting a mapping function from a plurality of mapping functions, wherein each mapping function maps the scaling parameter to a mapped value corresponding to the magnitude of the scaling parameter; signaling, in a video bitstream, a first syntax element, a value of the first syntax element indicating the mapping function selected from the plurality of mapping functions; and signaling, in the video bitstream, a second syntax element, wherein the second syntax element includes the mapped value corresponding to the selected mapping function and wherein signaling a second syntax element includes encoding the value of the second syntax element with a specific binarization method regardless of the value of the first syntax element.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 10A-10C illustrate sets of scaling parameters according to various techniques for signaling sets of scaling parameters.

DETAILED DESCRIPTION

Figure 1:
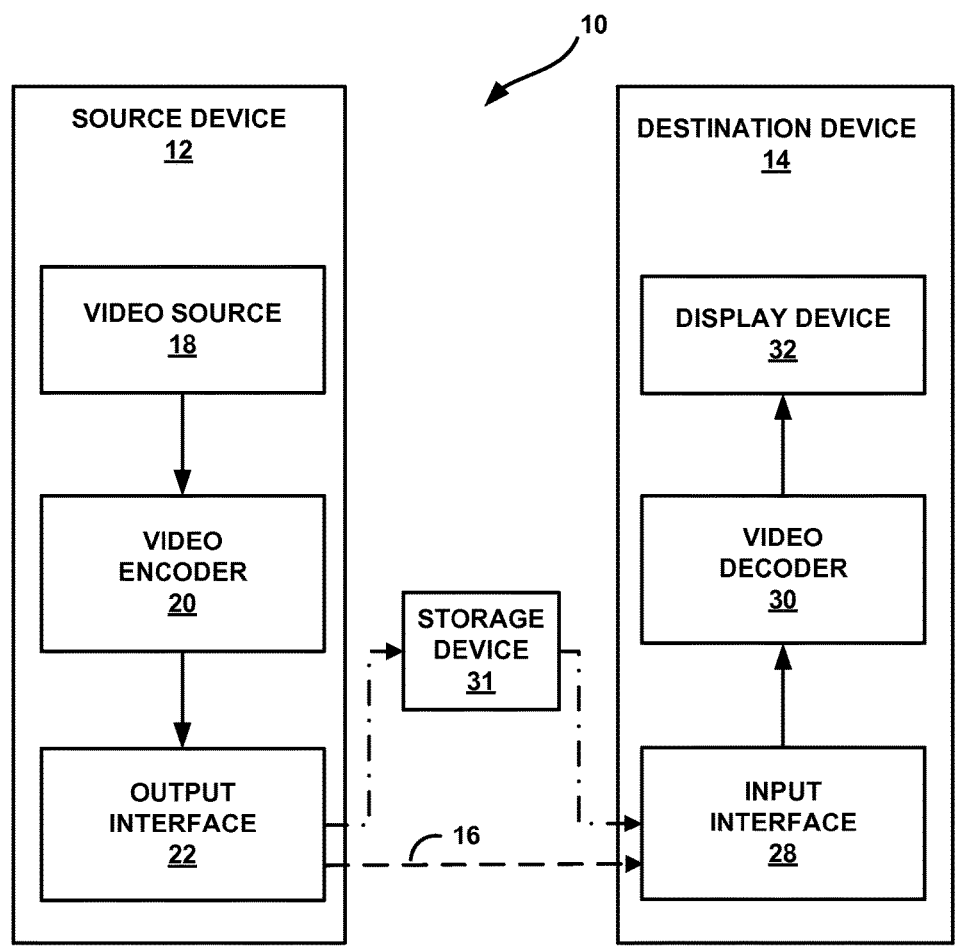
FIG. 1 is a block diagram illustrating an example video encoding and decoding system 10 that may utilize the techniques of this disclosure for cross-component prediction.

In general, this disclosure relates to techniques for performing cross-component prediction (CCP) in a video encoding process and/or a video decoding process. More specifically, this disclosure describes techniques related to the signaling and derivation of scaling parameters and offsets for CCP. It may be used in the context of advanced video codecs, such as extensions of HEVC or the next generation of video coding standards.

A video coder (i.e. a video encoder or decoder) is generally configured to code a video sequence, which is generally represented as a sequence of pictures. Typically, the video coder uses block-based coding techniques to code each of the sequences of pictures. As part of block-based video coding, the video coder divides each picture of a video sequence into blocks of data. The video coder codes (i.e., encodes or decodes) each of the blocks. Encoding a block of video data generally involves encoding an original block of data by identifying one or more predictive blocks for the original block, and a residual block that corresponds to differences between the original block and the one or more predictive blocks. Specifically, the original block of video data includes a matrix of pixel values, which are made up of one or more channels of "samples," and the predictive block includes a matrix of predicted pixel values, each of which are also made of predictive samples. Each sample of a residual block indicates a pixel value difference between a sample of a predictive block and a corresponding sample of the original block.

Prediction techniques for a block of video data are generally categorized as intra-prediction and inter-prediction. Intra-prediction (e.g., spatial prediction) generally involves predicting a block from pixel values of neighboring, previously coded blocks within the same picture. Inter-prediction generally involves predicting the block from pixel values of previously coded blocks in previously coded pictures.

The pixels of each block of video data each represent color in a particular format, referred to as a "color representation." Different video coding standards may use different color representations for blocks of video data. As one example, the main profile of the High Efficiency Video Coding (HEVC) video standard, which was developed by the Joint Collaborative Team on Video Coding (JCT-VC), uses the YCbCr color representation to represent the pixels of blocks of video data.

The YCbCr color representation generally refers to a color representation in which each pixel of video data is represented by three components or channels of color information, "Y," "Cb," and "Cr." The Y channel represents luminance (i.e., light intensity or brightness) data for a particular pixel. The Cb and Cr components are the blue-difference and red-difference chrominance, i.e., "chroma," components, respectively. YCbCr is often used to represent color in compressed video data because there is typically a decorrelation between each of the Y, Cb, and Cr components, meaning that there is little data that is duplicated or redundant among each of the Y, Cb, and Cr components. Coding video data using the YCbCr color representation therefore offers good compression performance in many cases.

Additionally, many video coding techniques utilize a technique, referred to as "chroma subsampling" to further improve compression of color data. Chroma sub-sampling of video data having a YCbCr color representation reduces the number of chroma values that are signaled in a coded video bitstream by selectively omitting chroma components according to a pattern. In a block of chroma sub-sampled video data, there is generally a luma value for each pixel of the block. However, the Cb and Cr components may only be signaled for some of the pixels of the block, such that the chroma components are sub-sampled relative to the luma component.

A video coder (which may refer to a video encoder or a video decoder) interpolates Cb and Cr components for pixels where the Cb and Cr values are not explicitly signaled for chroma sub-sampled blocks of pixels. Chroma sub-sampling works well to reduce the amount of chrominance data without introducing distortion in blocks of pixels that are more uniform. Chroma sub-sampling works less well to represent video data having widely differing chroma values, and may introduce large amounts of distortion in those cases.

The HEVC Range Extension and Screen Content Coding Extension, which are extensions to the HEVC standard, add support to HEVC for additional color representations (also referred to as "color formats"). The support for other color formats may include support for encoding and decoding RGB sources of video data, as well as video data having other color representations and using different chroma subsampling patterns than the HEVC main profile.

As mentioned above, the HEVC main profile uses YCbCr because of the strong color decorrelation between the luma component, and the two chroma components of the color representation (also referred to as a color format). In many cases however, there may still be correlations among Y, Cb, and Cr components. The correlations between components of a color representation may be referred to as cross-color component correlation or inter-color component correlation.

The techniques of this disclosure may exploit the correlation between samples in the residual domain. A video coder (i.e. a video encoder or a video decoder) configured in accordance with the techniques of this disclosure may be configured to determine blocks of chroma residual samples from predictors of blocks of chroma residual samples and blocks of luma residual samples that correspond to each other. In some examples, an updated block of chroma residual values may be determined based on a predictor for the block of chroma residual samples and a corresponding block of luma residual samples. The block of luma residual samples may be modified with a scale factor and/or an offset.

One or more examples of this disclosure may be directed to inter-color component residual prediction techniques that may utilize YCbCr chroma YCbCr 4:4:4 and/or YCbCr 4:2:2 chroma subsampling formats. However, a video coder configured in accordance with the techniques of this disclosure may process blocks of other color formats, such as blocks having an RGB color format in a similar way as YCbCr 4:4:4 using the techniques disclosed herein.

FIG. 1 is a block diagram illustrating an example video encoding and decoding system 10 that may utilize the techniques of this disclosure for cross-component prediction. As shown in FIG. 1, system 10 includes a source device 12 that generates encoded video data to be decoded at a later time by a destination device 14. In particular, source device 12 provides the video data to destination device 14 via a computer-readable medium (such as storage device 31) or a link 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device. In some cases, source device 12 and destination device 14 may be equipped for wireless communication.

Destination device 14 may receive the encoded video data to be decoded via storage device 31. Storage device 31 may comprise any type of medium or device capable of moving the encoded video data from source device 12 to destination device 14. In one example, storage device 31 may comprise a communication medium to enable source device 12 to transmit encoded video data directly to destination device 14. In another example, link 16 provides a communications medium used by source device 12 to transmit encoded video data directly to destination device 14.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device 31. Similarly, encoded data may be accessed from the storage device 31 by input interface 28. The storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 31 may correspond to a file server or another intermediate storage device that may store the encoded video generated by source device 12.

Destination device 14 may access stored video data from the storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for cross-component prediction in video coding. In other examples, a source device and a destination device may include other components or arrangements. For example, source device 12 may receive video data from an external video source 18, such as an external camera. Likewise, destination device 14 may interface with an external display device, rather than including an integrated display device. In addition, if video source 18 is a video camera, source device 12 and destination device 14 may form so-called camera phones or video phones. The techniques described in this disclosure may be applicable to video coding in general, and may be applied to wireless and/or wired applications.

The illustrated encoding and decoding system 10 of FIG. 1 is merely one example. Techniques for cross-component prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium such as storage 31 or to destination device 14 via link 16.

A computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium may be understood to include one or more computer-readable media of various forms, in various examples.

This disclosure may generally refer to video encoder 20 "signaling" certain information to another device, such as video decoder 30. It should be understood, however, that video encoder 20 may signal information by generating syntax elements and associating the syntax elements with various encoded portions of video data. That is, video encoder 20 may "signal" data by storing certain syntax elements to headers of various encoded portions of video data. In some cases, such syntax elements may be generated, encoded, and stored (e.g., stored to the computer-readable medium) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from storage 31. The information of a computer-readable medium such as storage device 31 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In one example approach, video encoder 20 encodes a block of video data according to the techniques of this disclosure by determining a scaling parameter for cross-component prediction of a block of video data, selecting a mapping function from a plurality of mapping functions, wherein each mapping function maps the scaling parameter to a mapped value corresponding to the magnitude of the scaling parameter, signaling, in a video bitstream, a first syntax element, a value of the first syntax element indicating the mapping function selected from the plurality of mapping functions, and signaling, in the video bitstream, a second syntax element, wherein the second syntax element includes the mapped value corresponding to the selected mapping function.

In one example approach, video decoder 30 decodes video data according to the techniques of this disclosure by receiving a first syntax element for a block of video data, a value of the first syntax element indicating one of a plurality of mapping functions to be used to determine a magnitude of a scaling parameter for cross-component prediction, receiving a second syntax element for the block of video data, a value of the second syntax element corresponding to the magnitude of the scaling parameter, determining the magnitude of the scaling parameter from a set of scaling parameter values using the one of the plurality of mapping functions indicated by the first syntax element and the value of the second syntax element, and performing cross-component prediction for at least one chroma component of the block video data using the determined magnitude of the scaling parameter.

In one example approach, a device 14 includes a memory configured to store video data and a video decoder 30 connected to the memory. Video decoder 30 is configured to receive a first syntax element for a block of the video data, a value of the first syntax element indicating one of a plurality of mapping functions to be used to determine a magnitude of a scaling parameter for cross-component prediction, to receive a second syntax element for the block of video data, a value of the second syntax element corresponding to the magnitude of the scaling parameter; determine the magnitude of the scaling parameter from a set of scaling parameter values using the one of the plurality of mapping functions indicated by the first syntax element and the value of the second syntax element, and to perform cross-component prediction for at least one chroma component of the block video data using the determined magnitude of the scaling parameter.

In another example approach, video decoder 30 includes means for receiving a first syntax element for a block of video data, a value of the first syntax element indicating one of a plurality of mapping functions to be used to determine a magnitude of a scaling parameter for cross-component prediction, means for receiving a second syntax element for the block of video data, a value of the second syntax element corresponding to the magnitude of the scaling parameter, means for determining the magnitude of the scaling parameter from a set of scaling parameter values using the one of the plurality of mapping functions indicated by the first syntax element and the value of the second syntax element, and means for performing cross-component prediction for at least one chroma component of the block video data using the determined magnitude of the scaling parameter.

Video encoder 20 and video decoder 30, in some examples, may operate according to a video coding standard, such as the HEVC and may conform to the HEVC Test Model (HM). HEVC was developed by the Joint Collaboration Team on Video Coding (JCT-VC) of ITU-T Video Coding Experts Group (VCEG) and ISO/IEC Motion Picture Experts Group (MPEG) and approved as ITU-T H.265 and ISO/IEC 23008-2. The current version of ITU-T H.265 is available at www.itu.int/rec/T-REC-H.265. One Working Draft of the Range extensions to HEVC, referred to as RExt WD7 hereinafter, is available from http://phenix.int-evry.fr/jct/doc_end_user/documents/17_Valencia/wg11/JCTVC-O1005-v8.zip. One working draft of the Screen Content Coding extension to HEVC, referred to as SCC WD3 hereinafter, is available from: http://phenix.int-evry.fr/jct/doc_end_user/current_document.php?id=10025

The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is typically square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. For intra modes, the TUs are typically sized based on the size of PUs within a given CU defined for a partitioned LCU, although this may not always be the case. The TUs are typically the same size or smaller than the PUs. For inter modes, the TUs could be larger than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU.

Moreover, a PU includes data related to the prediction process. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Figure 2:
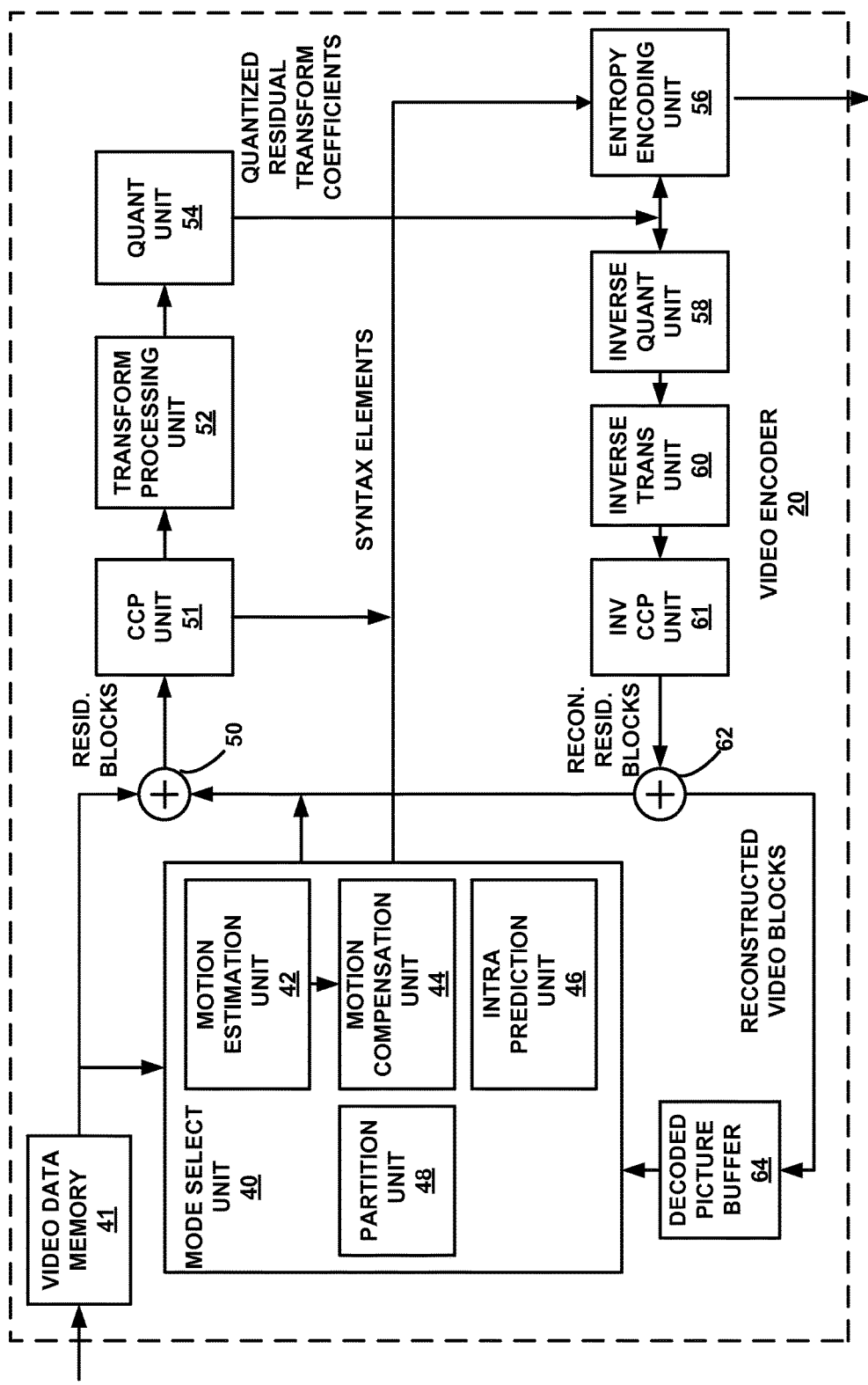
FIG. 2 is a block diagram illustrating an example of video encoder 20 that may implement techniques of this disclosure for cross-component prediction, as will be explained in more detail below.

FIG. 2 is a block diagram illustrating an example of video encoder 20 that may implement techniques of this disclosure for cross-component prediction, as will be explained in more detail below.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes a video data memory 41, a mode select unit 40, decoded picture buffer (DPB) 64, summer 50, cross-component prediction processing unit 51, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, inverse cross-component prediction processing unit 61 and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter). Example filers may include adaptive loop filters, sample adaptive offset (SAO) filters or other types of filters.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

Cross-component prediction processing unit 51 is an adaptively switched predictor that codes the residuals of a second and third color component using the residual of the first color component. In one example approach, in the case of $YC_bC_r$, the residual of the luma (Y) luma component is used to code the residuals of the two chroma ($C_b$, $C_r$) components. In another example approach, the residual of the green (G) channel of RGB is used to code the residuals of the red (R) and blue (B) channels. Cross-component prediction processing unit 51 may be configured to perform the techniques of this disclosure related to determining and signaling a mapping function for a scaling parameter for cross-component prediction. These techniques are described in further detail below.

Transform processing unit 52 applies the transform to the residual block, producing a block of residual transform coefficients. The transform may convert the residual information from a pixel value domain to a transform domain, such as a frequency domain. Transform processing unit 52 may perform transforms such as discrete cosine transforms (DCTs) or other transforms that are conceptually similar to DCT. Wavelet transforms, integer transforms, sub-band transforms or other types of transforms could also be used. Transform processing unit 52 may send the resulting transform coefficients to quantization unit 54. In some examples, the transform process may be skipped.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive binary arithmetic coding (CABAC) or other entropy coding processes, such as context adaptive variable length coding (CAVLC), syntax-based context-adaptive binary arithmetic coding (SBAC), or probability interval partitioning entropy (PIPE) coding. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58, inverse transform unit 60 and inverse cross-component prediction processing unit 61 apply inverse quantization, inverse transformation and inverse cross-component prediction processing, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

In one example approach, cross-component prediction processing unit 51 encodes a block of video data according to the techniques of this disclosure by determining a scaling parameter for cross-component prediction of a block of video data, selecting a mapping function from a plurality of mapping functions, wherein each mapping function maps the scaling parameter to a mapped value corresponding to the magnitude of the scaling parameter, signaling, in a video bitstream, a first syntax element, a value of the first syntax element indicating the mapping function selected from the plurality of mapping functions, and signaling, in the video bitstream, a second syntax element, wherein the second syntax element includes the mapped value corresponding to the selected mapping function.

Figure 3:
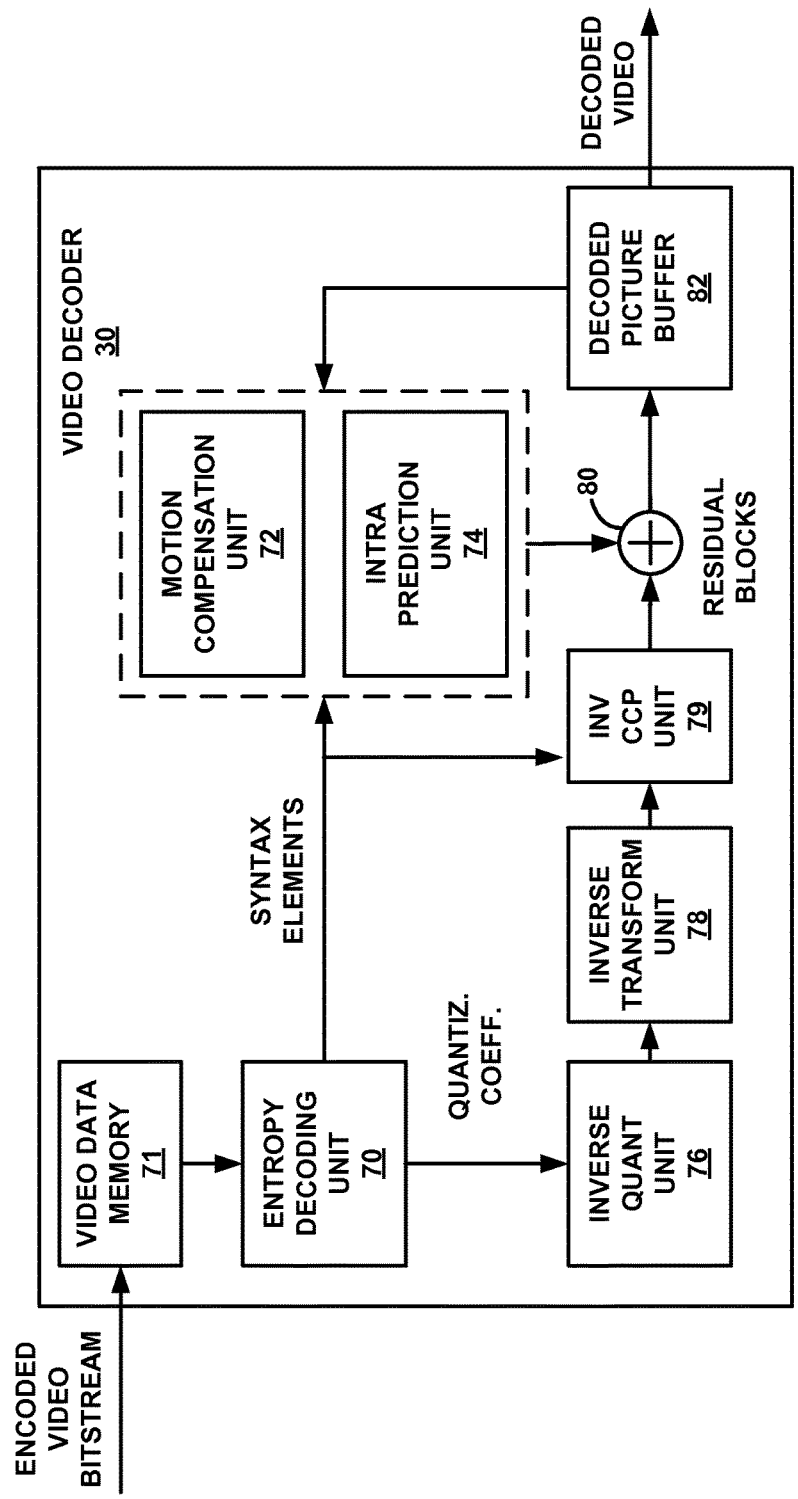
FIG. 3 is a block diagram illustrating an example of video decoder 30 that may implement techniques for cross-component prediction.

FIG. 3 is a block diagram illustrating an example of video decoder 30 that may implement techniques for cross-component prediction. In the example of FIG. 3, video decoder 30 includes an a video data memory 71, an entropy decoding unit 70, motion compensation unit 72, intra-prediction unit 74, inverse quantization unit 76, inverse transformation unit 78, inverse cross-component prediction processing unit 79, decoded picture buffer (DPB) 82 and summer 80.

Video data memory 71 may store video data, such as an encoded video bitstream, to be decoded by the components of video decoder 30. The video data stored in video data memory 71 may be obtained, for example, from a computer-readable medium, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 entropy decodes the bitstream to generate quantized coefficients, motion vectors or intra-prediction mode indicators, and other syntax elements. Video decoder 30 may receive the syntax elements at the video slice level and/or the video block level.

When a video slice is coded as an intra-coded (I) slice, intra-prediction unit 74 may generate prediction data for a video block of the current video slice based on a signaled intra prediction mode and data from previously decoded blocks of the current frame or picture.

When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in decoded picture buffer 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

Inverse cross-component prediction processing unit 79 receives the coded residuals of the second and third color components and reconstructs the residuals of the second and third color components as a function of the first color component. In the case of $YC_bC_r$, the luma (Y) component may be used, for example, as the first component and, in that case, the residual of the luma component is used to reconstruct the residuals of the two chroma ($C_b$, $C_r$) components. Likewise, in the case of RGB, the green (G) component may be used, for example, as the first component and, in that case, the residual of the green component is used to reconstruct the residuals of the red (R) and blue (B) components. This process is described in further detail below.

After motion compensation unit 72 or intra-prediction unit 74 generates the predictive block for the current video block based on motion vectors or other syntax elements, video decoder 30 forms a decoded video block by summing the residual blocks from inverse cross-component prediction processing unit 79 with the corresponding predictive blocks generated by motion compensation unit 72 or intra-prediction unit 74. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

In one example approach, inverse cross-component prediction processing unit 79 decodes video data according to the techniques of this disclosure by receiving a first syntax element for a block of video data, a value of the first syntax element indicating one of a plurality of mapping functions to be used to determine a magnitude of a scaling parameter for cross-component prediction, receiving a second syntax element for the block of video data, a value of the second syntax element corresponding to the magnitude of the scaling parameter, determining the magnitude of the scaling parameter from a set of scaling parameter values using the one of the plurality of mapping functions indicated by the first syntax element and the value of the second syntax element, and performing cross-component prediction for at least one chroma component of the block video data using the determined magnitude of the scaling parameter.

Figure 4:
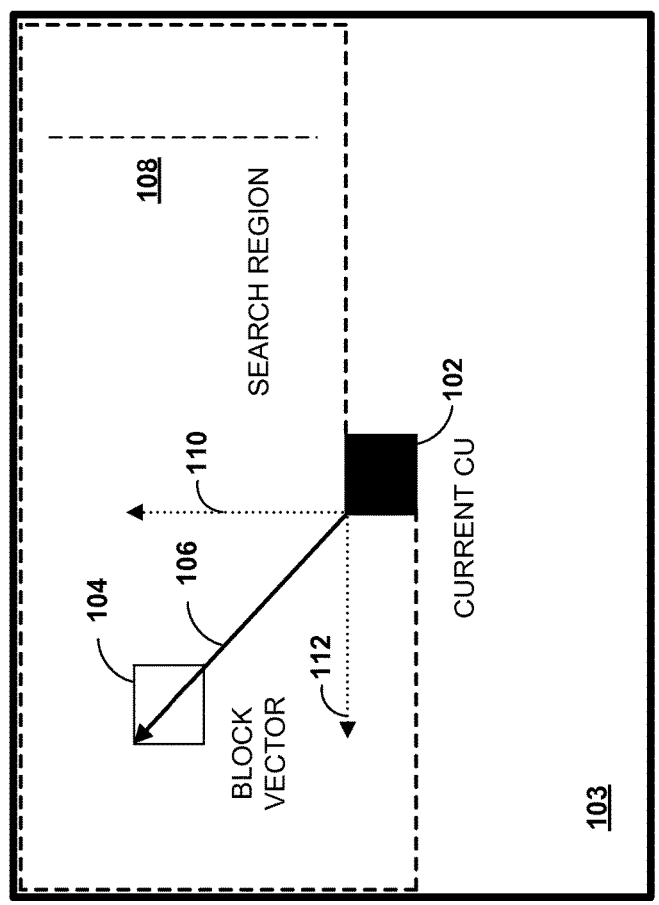
FIG. 4 is a conceptual diagram illustrating an Intra Block-Copy (BC) coding technique.

Intra BC techniques have been included in HEVC RExt. FIG. 4 is a conceptual diagram illustrating an example technique for predicting a current video block 102 within a current picture 103 according to an intra BC mode. FIG. 4 illustrates a predictive video block 104 within current picture 103. A video coder, e.g., video encoder 20 and/or video decoder 30, may use predictive video block 104 to predict current video block 102 according to an intra BC mode in accordance with the techniques of this disclosure.

Video encoder 20 determines a predictive video block 104 for predicting current video block 102 from a set of previously reconstructed blocks of video data. That is, predictive video block 104 is determined from among the blocks of video data that were already encoded and reconstructed in the same frame as current video block 102. Video encoder 20 reconstructs blocks of video data by inverse quantizing and inverse transforming the video data that is also included in the encoded video bitstream, and summing the resulting residual blocks with the predictive blocks used to predict the reconstructed blocks of video data.

In the example of FIG. 4, search region 108 within current picture 103, which may also be referred to as an "intended area," "search area," or "raster area," includes a set of previously reconstructed video blocks. Video encoder 20 may determine predictive video block 104 used to predict current video block 102 from among the video blocks in search region 108 based on an analysis of the relative efficiency and accuracy of predicting and coding current video block 102 based on various video blocks within search region 108.

Video encoder 20 determines a two-dimensional block vector 106 (also called an offset vector, displacement vector, or motion vector) representing the location or displacement of predictive video block 104 relative to current video block 102. In some examples, block vector 106 is calculated from the position of the upper left pixel of predictive video block 104 and the position of the upper left pixel of current video block 102. However, block vector 106 may be calculated relative to any predefined or signaled position within predictive video block 104 and current video block 102.

Block vector 106 is a two-dimensional vector that includes a horizontal displacement component 112 (i.e., an x-component) and a vertical displacement component 110 (i.e., a y-component), which respectively represent the horizontal and vertical displacement of predictive video block 104 relative to current video block 102. Video encoder 20 may include one or more syntax elements that identify or define block vector 106, e.g., that define horizontal displacement component 112 and vertical displacement component 110, in the encoded video bitstream. Video decoder 30 may decode the one or more syntax elements to determine the horizontal and vertical displacement components of block vector 106, and use the determined block vector to identify predictive video block 104 for current video block 102.

Current video block 102 may be a CU, or a PU of a CU. In some examples, a video coder (e.g., video encoder 20 and/or video decoder 30) may split a CU that is predicted according to intra BC into a number of PUs (see, for example, FIGS. 5A and 5B). In such examples, the video coder may determine a respective (e.g., different) BVD for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+ (N/2)×N) PUs, (N×(N/2)+N×(3N/2)) PUs, (N×(3N/2)+N× (N/2)) PUs, four (N/2)×2N PUs, or four 2N×(N/2) PUs. In some examples, video coder may predict a 2N×2N CU using a 2N×2N PU.

As shown in FIG. 4, it may be observed that predictive video block 104 can only be inside the already decoded region (i.e., search region 108) and cannot fall outside this region. In some proposals for the SCC, rather than coding the entirety of block vector 106, a block vector difference (BVD) is coded in the bitstream. The BVD is the block vector minus a block vector predictor (BVP). There have been various proposals related to BVP prediction methods, and a core experiment was setup to study such methods (the document Sole, et al. "HEVC Screen Content Coding Core Experiment 1 (SCCE1): Intra Block Copying Extensions," Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, JCTVC-Q1121 details some methods).

If the predictor of the current block is known while parsing, valid and invalid BVDs can be derived and such information can be used to optimize BVD coding. Motivated by this observation, systems and methods to improve BVD coding are disclosed. Various aspects on intra BC coding are disclosed herein. Each of the examples described below may be applied jointly or separately with other examples.

The next section will discuss various features of HEVC that are relevant to the cross-component prediction (CCP) techniques of this disclosure.

As noted above, in HEVC, the largest coding unit in a slice is called a coding tree block (CTB). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB, although and as small as 8×8. Each CU is coded with one mode (e.g., inter coding or intra coding). When a CU is inter coded, it may be further partitioned into two prediction units (PUs) or become just one PU when further partitioning does not apply. When two PU's are present in one CU, they can be half size rectangles or two rectangle size with ¼ or ¾ size of the CU.

When a CU is inter coded, one set of motion information is present for each PU. In addition, each PU is coded with a unique inter-prediction mode to derive the set of motion information. In HEVC, the smallest PU sizes are 8×4 and 4×8.

HEVC specifies four transform units (TUs) sizes of 4×4, 8×8, 16×16, and 32×32 to code a prediction residual. A CTB may be recursively partitioned into four or more TUs. TUs use integer basis functions that are similar to the discrete cosine transform (DCT). In addition 4×4 luma transform blocks that belong to an intra coded region are transformed using an integer transform that is derived from discrete sine transform (DST). Chroma transform blocks use the same TU sizes as luma transform blocks.

In the current HEVC specification, for the luma component of each PU, an intra prediction mode is determined from 33 angular prediction modes (indexed from 2 to 34), a DC mode (indexed with 1), and a Planar mode (indexed with 0). In addition to the above 35 intra modes, one more mode, named 'I-PCM', is also employed by HEVC. In I-PCM mode, prediction, transform, quantization, and entropy coding are bypassed while the prediction samples are coded by a predefined number of bits. The main purpose of the I-PCM mode is to handle the situation when the signal cannot be efficiently coded by other modes.

In the HEVC standard, there are motion vector prediction processes for inter prediction, named merge (skip is considered as a special case of merge) and advanced motion vector prediction (AMVP) modes, respectively, for a PU. In either AMVP or merge mode, a motion vector (MV) candidate list is maintained for multiple motion vector predictors. The motion vector(s), as well as reference indices in the merge mode, of the current PU are generated by taking copying the motion vector and reference index from one candidate (e.g., a neighboring block) from the MV candidate list.

In some examples, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 5B:
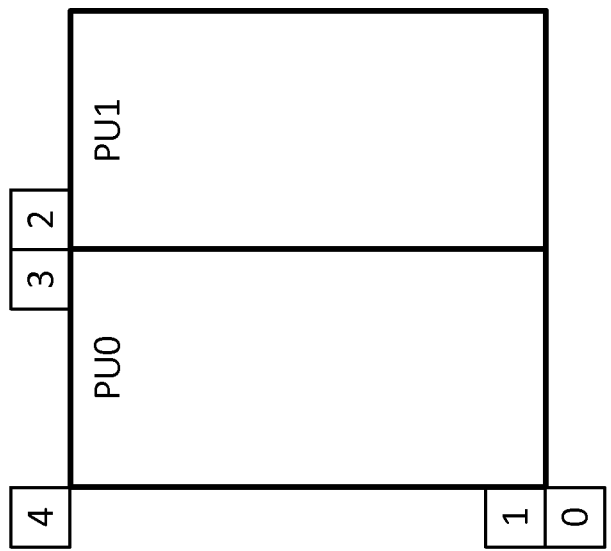
FIGS. 5A and 5B are conceptual diagrams showing example candidate blocks for motion vector prediction.
Figure 5A:
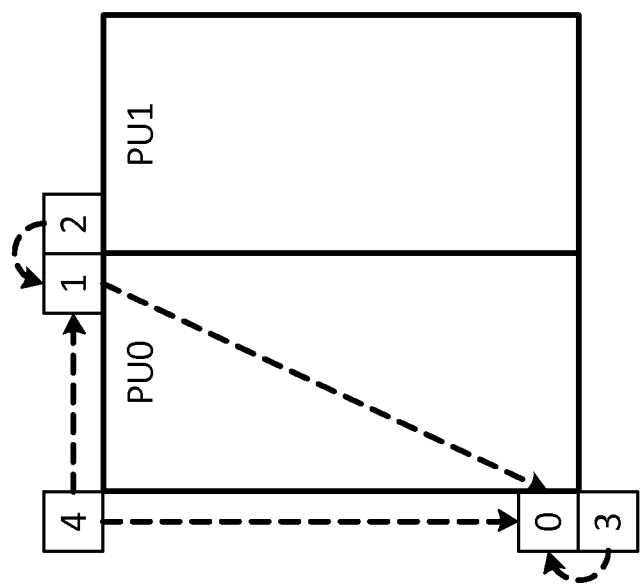

Spatial MV candidates are derived from the neighboring blocks shown on FIG. 5A, for a specific PU (PU0), although the methods generating the candidates from the blocks differ for merge and AMVP modes. In merge mode, up to four spatial MV candidates can be derived with the orders showed on FIG. 5A. The order of checking MV candidates is as follows: left (0), above (1), above right (2), below left (3), and above left (4).

In AVMP mode, the neighboring blocks are divided into two groups: left group consisting of the block 0 and 1, and above group consisting of the blocks 2, 3, and 4 as shown on FIG. 5B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

In Wei Pu, et al., "RCE1: Descriptions and Results for Experiments 1, 2, 3, and 4," JCT-VC of ITU-T SG 16 WP 3 and ISO/IEC JTC1/SC 29/WG 11, 15$^{th}$ Meeting: Geneva, CH 25 Oct.-1 Nov. 2013 (JCTVC-O0202), techniques for CCP were proposed to remove the correlation among color components by using the luma residual as a predictor for the residual of the chroma components. To perform CCP a set of scaling parameters is predefined and one of the scaling parameters is selected and signaled in the bitstream. CCP may be performed for both intra- and inter-coded blocks. However, in case of intra coding, in some examples, only those with blocks direct mode (DM) chroma mode are allowed to use this prediction. A scaling parameter may be selected for each transform block.

Current proposals for CCP exhibit several drawbacks. One drawback involves the mapping function for the scaling parameter α, the decoded value of log 2_res_scale_abs_plus1. One approach for CCP uses a mapping function of:

$(\alpha?1<<(\alpha-1):0)$ to convert the decoded value α to the magnitude of the actually used scaling parameter. The statistical results of the scaling parameter α in coding RGB sequences and YCbCr sequences are quite different. Using the same mapping function may not, therefore, be optimal for different color coding formats.

A second drawback is that the fixed set of scaling parameters is not applicable to a variety of test sequences.

What are described next are solutions that address these drawbacks in order to improve the coding performance of cross-component prediction. In one example approach, new scaling parameters based on coded information may be used to produce additional coding gains.

Figure 6:
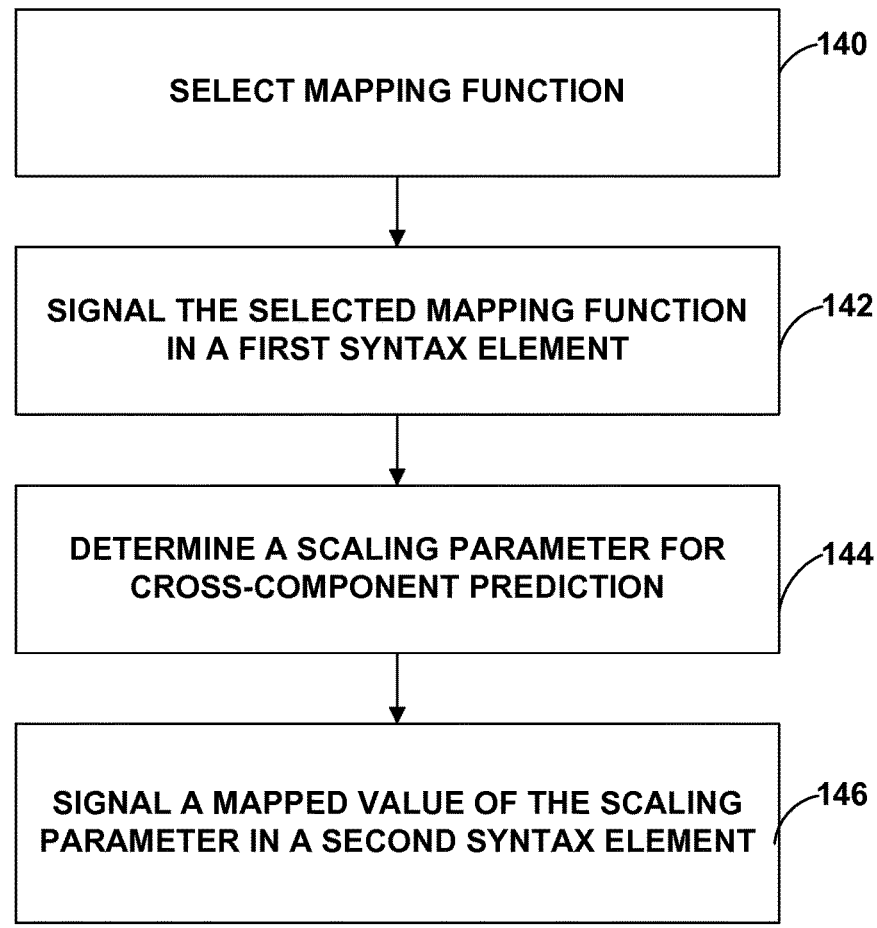
FIG. 6 is a flowchart illustrating an example process for signaling cross-component prediction parameters in accordance with one or more aspects of this disclosure.

FIG. 6 is a flowchart illustrating an example process for signaling cross-component prediction parameters in accordance with one or more aspects of this disclosure. For purposes of illustration only, the method of FIG. 6 may be performed by a video encoder, such as a video encoder corresponding to video encoder 20 of FIGS. 1 and 2.

In the following discussion, for cross-component prediction, $r_C(x, y)$ represents the final chroma reconstructed residual sample at a position (x, y), $r'_C(x,y)$ represents the reconstructed chroma residual sample from the bit-stream at a position (x, y), and $r_L(x,y)$ represents the reconstructed residual sample in the luma component at a position (x, y). In one example approach, the chroma residual is predicted at the encoder side (based on a scaling parameter and/or offset selected from two or more sets of scaling parameters) as:

$$r_C'(x,y)=r_C(x,y)-(\alpha(i)\times r_L(x,y))>>3$$

and it is compensated at the decoder side as:

$$r_C(x,y)=r_C'(x,y)+(\alpha(i)\times r_L(x,y))>>3$$

where i indicates the selected set of scaling parameters and an index into the selected set indicates the selected scaling parameter α(i).

In another example approach, the chroma residual is predicted at the encoder side (based on a scaling parameter and/or offset selected from a set of scaling parameters) as:

$$r_C'(x,y)=r_C(x,y)-(\alpha\times r_L(x,y))>>3$$

and it is compensated at the decoder side as:

$$r_C(x,y)=r_C'(x,y)+(\alpha\times r_L(x,y))>>3$$

In one such example approach, the scaling parameter and/or offset used is signaled through signaling of a new mapping function or, in some embodiments, through signaling of just the scaling parameter and/or the offset. In some such approaches, the scaling parameters signaled become a part of the set of scaling parameters used by the decoder and encoder for future cross-component prediction.

In yet another example approach, a scaling parameter and/or offset is determined based on the residual information from previous frames.

A method of encoding video is shown in FIG. 6 which encompasses each of the above approaches. In one example approach, cross-component prediction (CCP) processing unit 51 in video encoder 20 encodes a block of video data according to the techniques of this disclosure. CCP processing unit 51 selects a mapping function (140) and signals the selected mapping function in a first syntax element (142). Each mapping function maps the scaling parameter to a mapped value corresponding to the magnitude of the scaling parameter. CCP processing unit 51 then determines a scaling parameter for cross-component prediction of a block of video data (144). CCP processing unit 51 signals, in a video bitstream, a second syntax element (146), wherein the second syntax element includes the mapped value of the scaling parameter corresponding to the selected mapping function. In one example approach, the first syntax is only signaled once for one whole slice/picture, while the value of the second syntax element is signaled, for example, at the TU level.

In one example approach, the set of scaling parameters α is allowed to be chosen from {−8, −4, −2, −1, 0, 1, 2, 4, 8}, inclusively. When α=0, the inter-component residual prediction is turned off. TU level on/off switch signaling may also be used to efficiently handle this case.

Syntax elements and semantics for an example CCP implementation are shown below. Related syntax elements are shown with italics.

7.3.2.3 Picture Parameter Set RBSP Syntax

| pic_parameter_set_rbsp( ) { | Descriptor |
|---|---|
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   ... | |
|   if( pps_range_extensions_flag ) { | |
|     if( transform_skip_enabled_flag ) | |
|       log2_max_transform_skip_block_size_minus2 | ue(v) |
|     *cross_component_prediction_enabled_flag* | u(1) |
|     chroma_qp_offset_list_enabled_flag | u(1) |
|     if( chroma_qp_offset_list_enabled_flag ) { | |
|       diff_cu_chroma_qp_offset_depth | ue(v) |
|       chroma_qp_offset_list_len_minus1 | ue(v) |
|       for( i = 0; i <= chroma_qp_offset_list_len_minus1; i++ ) { | |
|         cb_qp_offset_list[ i ] | se(v) |
|         cr_qp_offset_list[ i ] | se(v) |
|       } | |
|   ... | |
| } | |

7.8.1.10 Transform Unit Syntax

| transform_unit( x0, y0, xBase, yBase, log2TrafoSize, trafoDepth, blkIdx ) { | Descriptor |
|---|---|
| ... | |
|   if( cbfLuma ) | |
|     residual_coding( x0, y0, log2TrafoSize, 0 ) | |
|   if( log2TrafoSize > 2 || ChromaArrayType = = 3 ) { | |
|     if( cross_component_prediction_enabled_flag && cbfLuma && | |
|       ( CuPredMode[ x0 ][ y0 ] = = MODE_INTER \|\| | |
|         intra_chroma_pred_mode[ x0 ][ y0 ] = = 4 ) ) | |
|       *cross_comp_pred*( x0, y0, 0 ) | |
|     for( tIdx = 0; tIdx < ( ChromaArrayType = = 2 ? 2 : 1 ); tIdx++ ) | |
|       if( cbf_cb[ x0 ][ y0 + (tIdx << log2TrafoSizeC ) ][ trafoDepth ] ) | |
|         residual_coding( x0, y0 + ( tIdx << log2TrafoSizeC ), log2TrafoSizeC, 1 ) | |
|     if( cross_component_prediction_enabled_flag && cbfLuma && | |
|       ( CuPredMode[ x0 ][ y0 ] = = MODE_INTER \|\| | |
|         intra_chroma_pred_mode[ x0 ][ y0 ] = = 4 ) ) | |
|       *cross_comp_pred*( x0, y0, 1 ) | |
|     for( tIdx = 0; tIdx < ( ChromaArrayType = = 2 ? 2 : 1 ); tIdx++ ) | |
|       if( cbf_cr[ x0 ][ y0 + (tIdx << log2TrafoSizeC ) ][ trafoDepth ] ) | |
|         residual_coding( x0, y0 + ( tIdx << log2TrafoSizeC ), log2TrafoSizeC, 2 ) | |
|   } else if( blkIdx = = 3 ) { | |
|     for( tIdx = 0; tIdx < ( ChromaArrayType = = 2 ? 2 : 1 ); tIdx++ ) | |
|       if( cbf_cb[ xBase ][ yBase + ( tIdx << log2TrafoSizeC )][ trafoDepth − 1 ] ) | |
|         residual_coding( xBase, yBase + ( tIdx << log2TrafoSize), log2TrafoSize, 1 ) | |
|     for( tIdx = 0; tIdx < ( ChromaArrayType = = 2 ? 2 : 1 ); tIdx++ ) | |
|       if( cbf_cr[ xBase ][ yBase + ( tIdx << log2TrafoSizeC ) ][ trafoDepth − 1 ] ) | |
|         residual_coding( xBase, yBase + (tIdx << log2TrafoSize ), log2TrafoSize, 2 ) | |
|   } | |
| } | |
| } | |

7.3.8.12 Cross-component Prediction Syntax

| *cross_comp_pred*(x0, y0, c ){ *[Ed. Replace with cIdx]* | Descriptor |
|---|---|
|   log2_res_scale_abs_plus1[ c ] | ae(v) |
|   if( log2_res_scale_abs_plus1[ c ] != 0 ) | |
|     res_scale_sign_flag[ c ] | ae(v) |
| } | |

A decoding process for CCP will now be described and shown in FIG. 7. In one example approach, the signaling of the scaling parameter α has two parts, the first part is to code the magnitude (as log 2_res_scale_abs_plus1) and the second part is to code the sign flag (as res_scale_sign_flag). When coding the magnitude (i.e., abs(α) in the following table), it is first mapped to another non-negative value (i.e., M(α)) and then coded with the truncated unary binarization method. The mapping function for abs(α) for a first mapping function is shown in the following table.

| abs(α) | M(α) | Bin String |
|---|---|---|
| 0 | 0 | 0 |
| 1 | 1 | 10 |
| 2 | 2 | 110 |
| 4 | 3 | 1110 |
| 8 | 4 | 1111 |

The mapping function for abs(α) for a second mapping function is shown in the following table.

| abs(α) | M(α) | Bin String |
|---|---|---|
| 0 | 0 | 0 |
| 8 | 1 | 10 |
| 4 | 2 | 110 |
| 2 | 3 | 1110 |
| 1 | 4 | 1111 |

Figure 7:
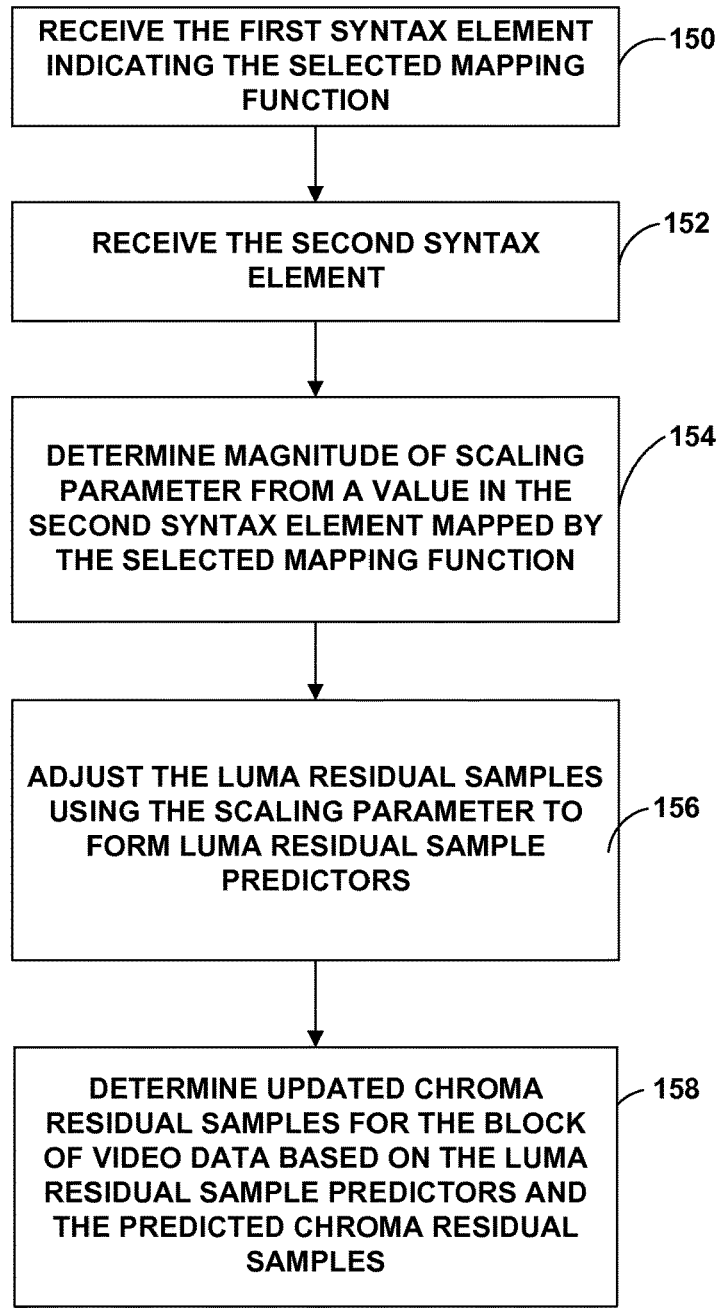
FIG. 7 is a flowchart illustrating an example process for decoding video including a cross-component prediction in accordance with one or more aspects of this disclosure.

FIG. 7 is a flowchart illustrating an example process for decoding video including a cross-component prediction in accordance with one or more aspects of this disclosure. In one example approach, inverse cross-component prediction processing unit 79 decodes video data according to the techniques of this disclosure by receiving a first syntax element for a block of video data (150). The first syntax element includes a value that indicates which one of a plurality of mapping functions is to be used to determine the magnitude of the scaling parameter used to scale the residual of the first component for either the second component or the third component, or both. Inverse CCP processing unit 79 also receives a second syntax element (152). The second syntax element includes a value. Inverse CCP processing unit 79 then determines the magnitude of the scaling parameter based on the value in the second syntax element (154) and adjusts residual values of a first color component (here, the luma component) (156). Inverse CCP processing unit 79 then performs cross-component prediction for at least one chroma component of the block video data using the determined magnitude of the scaling parameter (158).

In some example approaches, inverse CCP processing unit 79 uses a third syntax element to determine the sign of the scaling parameter.

In one example approach, inverse CCP processing unit 79 determines the magnitude of the scaling parameter using the mapping function indicated by the first syntax element and the value of the second syntax element. In one such approach, unit 79 uses the value in the second syntax element and the mapping function indicated by the first syntax element to map the value of the second syntax element to a predefined set of parameters as will be further detailed below. In one such approach, the set of scaling parameters is {−8, −4, −2, −1, 0, 1, 2, 4, 8}. The mapping functions are used to map the value in the second syntax element to one of the elements of the set of scaling parameters.

In one example approach, the value is mapped by the mapping function indicated by the first syntax element to obtain an index into one or more sets of parameters.

Figure 8:
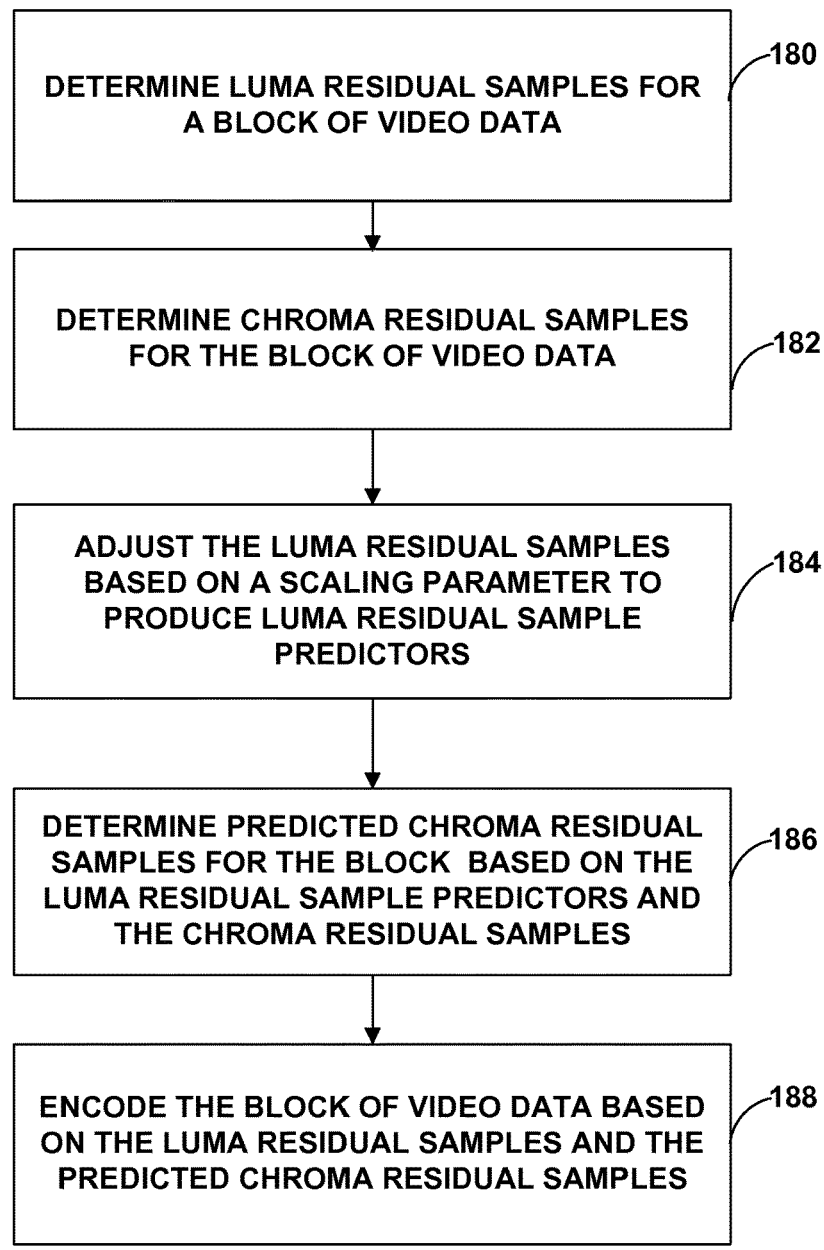
FIG. 8 is a flowchart illustrating an example process for encoding video with a cross-component prediction in accordance with one or more aspects of this disclosure.

In the method illustrated in FIG. 8, video encoder 20 determines luma residual samples for a block of video data (180), and determines chroma residual samples for the block of video data (182). In one example approach, video encoder 20 adjusts the luma residual samples with a scaling parameter selected from two or more sets of scaling parameters to produce luma residual sample predictors (184), and determines predictive chroma residual samples for the block of video data based on the chroma residual samples and the luma residual sample predictors (186). In another approach, the scale parameter also includes an offset. Video encoder 20 adjusts the luma residual samples with the scale parameter and offset selected to produce luma residual sample predictors (184), and determines predictive chroma residual samples for the block of video data based on the chroma residual samples and the luma residual sample predictors (186). Entropy encoding unit 56 of video encoder 20 may encode the predictive chroma residual samples and the luma residual samples (188).

As noted above, the same set of scaling parameters may not be optimal for all applications. To address this issue, system 10 includes two or more mapping function and, in some situations, two or more sets of scaling parameters. In one example approach, a first mapping function is used for YCbCr sequences, while a second mapping function is used for RGB sequences. In one such example approach, a syntax element is used to signal the desired mapping function. In an example approach having two mapping functions into a single set of scaling parameters, such a syntax element may take the form of the flag diff_mapping_alpha_enabled_flag.

In an example approach having three or more mapping functions, such a syntax element takes the form of an index diff_mapping_alpha_enabled_idx.

The mapping does not have to be to the same set of scaling parameters. In one example approach, diff_mapping_alpha_enabled_flag selects between two sets of scaling parameters, while the mapping into each set of parameters remains the same. Similarly, in the case of three or more sets of scaling parameters, an index from diff_mapping_alpha_enabled_idx selects between three or more sets of scaling parameters. A mixture of different mapping functions and sets of scaling parameters is also contemplated.

In the following discussion, the techniques of the disclosure will be discussed in terms of sets of scaling parameters. It should be understood that, in some case, the same results can be achieved by using different mapping functions into a single set of scaling parameters.

In one example approach, a scaling parameter $\alpha$ is chosen from two sets of scaling parameters {−8, −4, −2, −1, 0, 1, 2, 4, 8} and {−1, −2, −4, −8, 0, 8, 4, 2, 1}, inclusively. When $\alpha=0$, the inter-component residual prediction is turned off. TU level on/off switch signaling may also be used to efficiently handle this case. In one such approach, a value indicative of the scaling parameter selected is signaled to the decoder and is used to determine the scaling parameter to use in the decoder.

In another example approach, a scaling parameter $\alpha$ is chosen from two sets of scaling parameters and offsets. When $\alpha=0$, the inter-component residual prediction is turned off. TU level on/off switch signaling may also be used to efficiently handle this case. In one such approach, a value indicative of the scaling parameter/offset selected is signaled to the decoder and is used to determine the scaling parameter and offset to use in the decoder.

Figure 9:
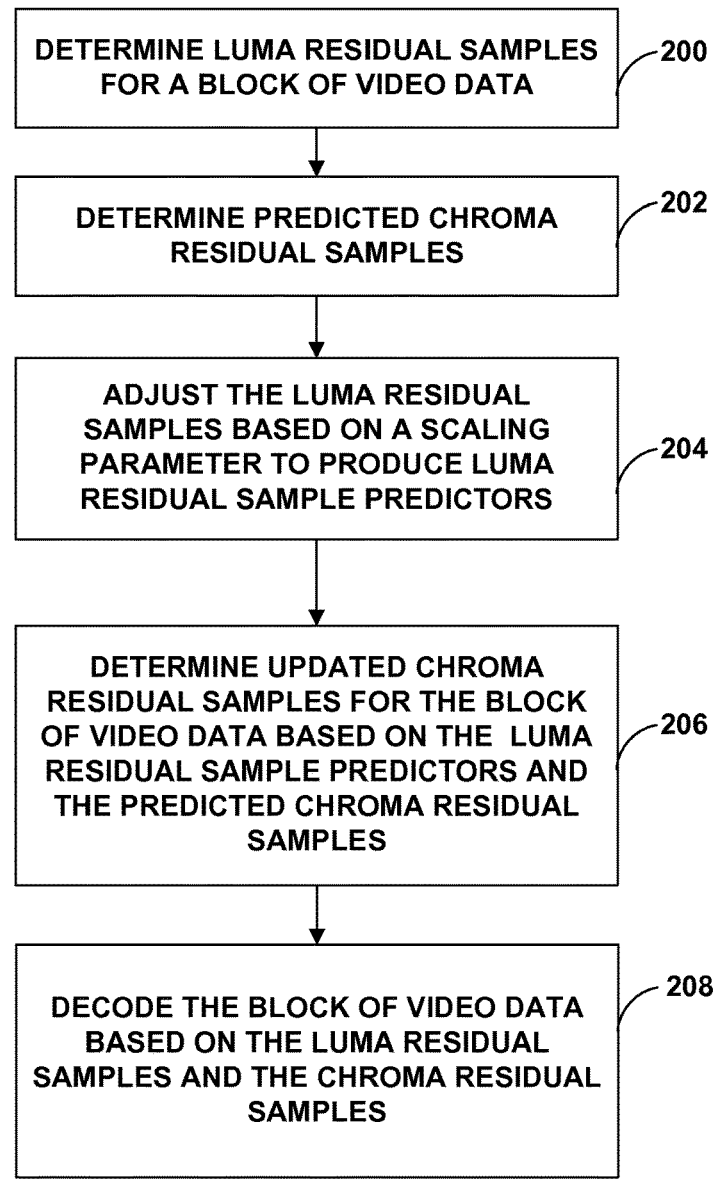
FIG. 9 is a flowchart illustrating an alternate example process for decoding video including cross-component prediction in accordance with one or more aspects of this disclosure.

FIG. 9 is a flowchart illustrating an example process for decoding video including a cross-component prediction in accordance with one or more aspects of this disclosure. For purposes of illustration only, the method of FIG. 9 may be performed by a video decoder, such as a video decoder corresponding to video decoder 30 of FIGS. 1 and 2.

In the method of FIG. 9, video decoder 30 may determine luma residual samples for a block of video data (200), and determine predictive chroma residual samples for the block of video data (202). Video decoder 30 may be further configured to, in one example approach, adjust the luma residual samples with a scale factor and or an offset to produce luma residual sample predictors (204). Furthermore, video decoder 30 may determine updated chroma residual samples based on the predictive chroma residual samples and the luma residual sample predictors (206). Video decoder decodes the block of video data based on the luma residual samples and the updated chroma residual samples (208).

Methods for signaling the scaling parameter will be discussed next. FIGS. 10A-10C illustrate sets of scaling parameters according to various techniques for signaling sets of scaling parameters. In one example approach, such as is shown in FIG. 10A, a first syntax element signals an index 164 used to index into the selected set 162 of scaling parameters, while a second syntax element (not shown) signals the sign of the scaling parameter. On the encoder side, in one example approach, a value representing the sign of the selected scaling parameter is stored in the second syntax element while index 164 is an index into a set of the magnitudes of the scaling parameters. In the example shown in FIG. 10A, scaling parameter $\alpha$ 160 is a function of a set selection flag 162 (e.g., diff_mapping_alpha_enabled_flag) and of index 164.

In one example approach, a selected scaling parameter and offset are signaled using set selection flag 162 (e.g., diff_mapping_alpha_enabled_flag) and index 164. In another example approach, a single set of scaling parameters is used and diff_mapping_alpha_enabled_flag 162 is used to select between mapping functions that map the scaling parameter to an index into the set of scaling parameters.

In a second example approach, the first and second syntax elements combined index into a set of up to eight signed scaling parameters. On the encoder side, in one example embodiment, the most significant bit of an index into the set of eight signed scaling parameters is stored in the second syntax element, while the least significant two bits are stored in the first syntax element. One such example approach is shown in FIG. 10B, where scaling parameter α 170 is a function of set selection index 172 (e.g., diff_mapping_alpha_enabled_idx) and of sign 176 and index 174.

In one example approach, a selected scaling parameter and offset are signaled using set selection index 172 (e.g., diff_mapping_alpha_enabled_idx) and of sign 176 and index 174.

Current proposals for CCP use the syntax elements cross_component_prediction_enabled_flag, log 2_res_scale_abs_plus1[c] and res_scale_sign_flag[c] to define aspects of CCP based on the reconstructed residual samples of the luma component at a position (y,x). In some example approaches, these same syntax elements may be used to implement a set based approach to signaling a selected scaling parameter or offset.

The following is an example implementation of CCP according to the techniques of this disclosure. The following examples describes the syntax elements and semantics changes on top of the techniques disclosed in HEVC RExt WD7. The newly added parts are highlighted in BOLD and UNDERLINED and the deleted parts are marked as strikethrough.

7.3.2.3 Picture Parameter Set RBSP Syntax

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| ... | |
| if( pps_range_extensions_flag ) { | |
|   if( transform_skip_enabled_flag ) | |
|     log2_max_transform_skip_block_size_minus2 | ue(v) |
|   cross_component_prediction_enabled_flag | u(1) |
|   diff_mapping_alpha_enabled_flag | u(1) |
|   chroma_qp_offset_list_enabled_flag | u(1) |
|   if( chroma_qp_offset_list_enabled_flag ) { | |
|     diff_cu_chroma_qp_offset_depth | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
| ... | |
| } | |

Alternatively, the following applies:

7.3.2.3 Picture Parameter Set RBSP Syntax

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| ... | |
| if( pps_range_extensions_flag ) { | |
|   if( transform_skip_enabled_flag ) | |
|     log2_max_transform_skip_block_size_minus2 | ue(v) |
|   cross_component_prediction_enabled_flag | u(1) |
|   if(cross_component_prediction_enabled_flag) | |
|     diff_mapping_alpha_eanbled_flag | u(1) |
|   chroma_qp_offset_list_enabled_flag | u(1) |
|   if( chroma_qp_offset_list_enabled_flag ) { | |
|     diff_cu_chroma_qp_offset_depth | ue(v) |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|     } | |
| ... | |
| } | |

In one example approach, setting cross_component_prediction_enabled_flag equal to 1 specifies that diff_mapping_alpha_enabled_flag, log 2_res_scale_abs_plus1 and res_scale_sign_flag may be present in the transform unit syntax for pictures referring to the Picture Parameter Set (PPS). The syntax element cross_component_prediction_enabled_flag equal to 0 may indicate that log 2_res_scale_abs_plus1 and res_scale_sign_flag are not present for pictures referring to the PPS. When not present, the value of cross_component_prediction_enabled_flag is inferred to be equal to 0. When ChromaArrayType is not equal to 3, it is a requirement of bitstream conformance that the value of cross_component_prediction_enabled_flag shall be equal to 0.

In one example approach, the syntax element log 2_res_scale_abs_plus1[c] minus 1 specifies the base 2 logarithm of the magnitude of the scaling factor ResScaleVal used in cross-component residual prediction. This is one of the sets of scaling parameters that might be used in system 10. When not present, log 2_res_scale_abs_plus1 is inferred equal to 0.

In one example approach, the syntax element res_scale_sign_flag[c] is the third syntax element. The syntax element res_scale_sign_flag[c] specifies the sign of the scaling factor used in cross-component residual prediction as follows: If res_scale_sign_flag[c] is equal to 0, the corresponding ResScaleVal has a positive value. Otherwise (res_scale_sign_flag[c] is equal to 1), the corresponding ResScaleVal has a negative value.

As noted above, in one example approach, a new syntax element, diff_mapping_alpha_enabled_flag is used to select which one of two sets of scaling parameters to use as the source of the scaling parameter. A different syntax element, dIff_mapping_alpha_enabled_idx (not shown) is an index used to select which one of three or more sets of scaling parameters to use as the source of the scaling parameter.

The variable ResScaleVal[cIdx][x0][y0] specifies the scaling factor used in cross-component residual prediction. The array indices x0, y0 specify the location (x0, y0) of the top-left luma sample of the considered transform block relative to the top-left luma sample of the picture. The array index cIdx specifies an indicator for the color component; it is equal to 1 for Cb, and equal to 2 for Cr. In one such example approach, the variable ResScaleVal[cIdx][x0][y0]

is derived as follows: If log 2_res_scale_abs_plus1[cIdx−1] is equal to 0, the following applies:
 ResScaleVal[cIdx][x0][y0]=0
Otherwise, for one example approach, (for two sets of scaling parameters and for log 2_res_scale_abs_plus1[cIdx−1]) is not equal to 0), the following applies:
 Set the variable ScalPara equal to: !diff_mapping_alpha_enabled_flag?log 2_res_scale_abs_plus1[cIdx−1]:map[log 2_res_scale_abs_plus1[cIdx−1]]).
 ResScaleVal[cIdx][x0][y0]=(1<<ScalPara−1))*(1−2*res_scale_sign_flag[cIdx−1])
When diff_mapping_alpha_enabled_flag is equal to 0, the mapping function is defined as (1<<log 2_res_scale_abs_plus1[cIdx−1]−1) while when diff_mapping_alpha_enabled_flag is equal to 1, the mapping function is defined as (1<<map[log 2_res_scale_abs_plus1[cIdx−1]]−1). Note that log 2_res_scale_abs_plus1[cIdx−1] is the decoder value from parsing the bitstream, and ResScaleVal[cIdx][x0][y0] is the actual value that is used in CCP decoding process. The results are as shown in FIG. 10A for various values of cIdx.

Syntax elements and semantics for example CCP implementations are described in U.S. Provisional Application No. 62/015,301, filed Jun. 20, 2014, which is hereby incorporated by reference in their entirety.

A decoding process for CCP will now be described. In one example approach, the signaling of the scaling parameter α has two parts, the first part is to code the magnitude (as, from the example above, log 2_res_scale_abs_plus1) and the second part is to code the sign flag (as, from the example above, res_scale_sign_flag). In one example approach, when coding the magnitude (i.e., abs(α)), it is first mapped to another non-negative value (i.e., M(α)) and then coded with the truncated unary binarization method. In terms of the decoder side, M(α) is the decoded value, which is denoted by log 2_res_scale_abs_plus1[cIdx−1] in previous introductions. Examples of such mapping functions for abs(α) were shown in the following tables above and are illustrated as sets 0 and 1, respectively in FIGS. 10A and 10B.

In one example approach, one or more syntax elements are signaled in a sequence parameter set (SPS), a picture parameter set (PPS), or a slice header to indicate the particular mapping function to use to map the decoded value M(α) to a magnitude of the scaling parameter α. In one such approach, such as is shown in FIG. 10A, the set to use is selected via set selection flag 162 signaled in a sequence parameter set (SPS), a picture parameter set (PPS), or a slice header. In one such example approach, set selection flag 162 is signaled via a diff_mapping_alpha_enabled_flag as discussed above, while index 164 is signaled via log 2_res_scale_abs_plus1[c]. The current syntax design and binarization process for CCP are kept unchanged.

In one example approach, one of the mapping functions is defined as (α?1<<(α−1): 0), as in current HEVC range extension, while the other mapping function is defined as (α?(1<<(4−α)): 0), shown as Set 1 in FIG. 10A. The parameter set of Set 1 may be used, for example, to handle RGB sequences.

In a second example approach, two ways of mapping may result in two different sets of scaling parameters. For example, another new mapping function may be defined as: (α?(1<<(5−α)): 0), as illustrated in Set 2 of FIG. 10B. The parameter set of Set 2 may also be used, for example, to handle RGB sequences.

In a third example approach, the syntax element is signaled only when the syntax element cross_component_prediction_enabled_flag is equal to 1. In one such example approach, the syntax is:

| if(cross_component_prediction_enabled_flag) | |
|---|---|
| diff_mapping_alpha_enabled_flag | u(1) |

In a fourth example approach, a set selection index 172 is signaled in the SPS, PPS, or slice header to indicate one of a plurality of mapping functions, as shown in FIG. 10B. For example, a coder may have four mapping functions and index 172 signals which of the four mapping functions to use.

In one example approach, one of the chroma components may be used in the process described for the luma component above to predict the luma component and the other chroma component.

The context model for coding the sign flag of the scaling parameter may be dependent on the signaled mapping function. An example of this is shown in FIG. 10C, where sign 176 (e.g., res_scale_sign_flag[c])=0 indicates a minus sign for Set 1, while sign 176 (e.g., res_scale_sign_flag[c])=1 indicates a minus sign for Sets 0 and 2. In some example approaches, a new sign flag res_scale_new_sign_flag[c] is used for some states of diff_mapping_alpha_enabled_flag and for some values of diff_mapping_alpha_enabled_idx while res_scale_sign_flag[c] is used for other states of diff_mapping_alpha_enabled_flag and for other values of diff_mapping_alpha_enabled_idx.

In one aspect of the second example, when the newly introduced mapping function of this disclosure is enabled for one picture/slice/sequence, a separate context model is utilized with its initialization value unequal to 154, which corresponds to equal probabilities of 0 and 1. In one such example approach, a new syntax element res_scale_new_sign_flag[c] is used to introduce a different initialization value. For instance, in one such example approach, res_scale_sign_flag[c] has an initialization value of 154 for each of two or more values of ctxIdx, while res_scale_new_sign_flag[c] has an initialization value of 79 for each of two or more values of ctxIdx. The binarization and initialization process for the new syntax element res_scale_new_sign_flag[c] is described in Table 9-34 and 9-4, respectively. Since the possible values of res_scale_new_sign_flag[c] could only be 0 and 1, there is no need to perform the binarization process, i.e., the value is directly coded.

TABLE 9-34

Syntax elements and associated binarizations

| | | Binarization | |
|---|---|---|---|
| Syntax structure | Syntax element | Process | Input parameters |
| ... | | | |
| cross_comp_pred( ) | log2_res_scale_abs_plus1 | TR | cMax = 4, cRiceParam = 0 |
| | res_scale_sign_flag | FL | cMax = 1 |
| | res_scale_new_sign_flag | FL | cMax = 1 |
| residual_coding( ) | transform_skip_flag[ ][ ][ ] | FL | cMax = 1 |
| | ... | | |
| | coeff_sign_flag[ ] | FL | cMax = 1 |

TABLE 9-4

Association of ctxIdx and syntax elements for each initializationType in the initialization process

| Syntax structure | Syntax element | ctxTable | initType 0 | 1 | 2 |
|---|---|---|---|---|---|
| ... | | | | | |
| cross_comp_pred( ) | log2_res_scale_abs_plus1[ ] | Error! Reference source not found. | 0..7 | 8..15 | 16..23 |
| | res_scale_sign_flag[ ] | Table 9-38 | 0..1 | 2..3 | 4..5 |
| | res_scale_new_sign_flag[ ] | Table 9-38 | 0..1 | 2..3 | 4..5 |
| residual_coding( ) | transform_skip_flag[ ][ ][ 0 ] | Table 9-25 | 0 | 1 | 2 |
| | ... | | | | |
| | coeff_abs_level_greater1_flag[ ] | Table 9-30 | 0..23 | 24..47 | 48..71 |

TABLE 9-39

Assignment of ctxInc to syntax elements with context coded bins

| Syntax element | binIdx 0 | 1 | 2 | 3 | 4 | >=5 |
|---|---|---|---|---|---|---|
| ... | | | | | | |
| log2_res_scale_abs_plus1[ c ] | 4 * c + 0 | 4 * c + 1 | 4 * c + 2 | 4 * c + 3 | na | na |
| res_scale_sign_flag[ c ] | c | na | na | na | na | na |
| res_scale_new_sign_flag[c] | c | na | na | na | na | na |
| transform_skip_flag[ ][ ][ ] | 0 | na | na | na | na | na |

TABLE 9-38

Values of initValue for ctxIdx of res_scale_sign_flag

| Initialization variable | ctxIdx of res_scale_sign_flag | | | | | |
|---|---|---|---|---|---|---|
| | 0 | 1 | 2 | 3 | 4 | 5 |
| initValue | 154 | 154 | 154 | 154 | 154 | 154 |

TABLE 9-xx

Values of initValue for ctxIdx of res_scale_new_sign_flag

| Initialization variable | ctxIdx of res_scale_sign_flag | | | | | |
|---|---|---|---|---|---|---|
| | 0 | 1 | 2 | 3 | 4 | 5 |
| initValue | 79 | 79 | 79 | 79 | 79 | 79 |

Other techniques of signaling and applying scaling parameters 160 and 170 will be discussed next. In one example alternate approach, a new mapping function is signaled via the SPS, PPS, or slice header. Such an approach may be used, for instance, to replace the default mapping process, e.g., the existing mapping process specified in the HEVC RExt (shown as set 0 in FIGS. 10A-10C), with a different mapping process. In one example approach, the mapping function may signal a change from the default mapping to a new mapping that, for instance, maps the index (164 or 174) to a scaling parameter and an offset. For instance, the new mapping process may determine a scaling parameter and an offset for each of the set of values indexed by decoded index 164 or by decoded index 174. Such an approach can be used where scaling alone is not sufficient.

In one example approach, a decoder receives a signal indicating a new mapping function, determines, based on the new mapping function, a value for a scaling parameter α; and reconstructs, based on the value of the scaling parameter α, a chroma reconstructed residual sample $r_C(x,y)$ for each position (x, y) in a block of video data, wherein $r_C(x,y) = r'_C(x,y) + (\alpha \times r_L(x,y)) \gg 3$, where $r'_C(x,y)$ represents a reconstructed chroma residual sample from the bit-stream at each position (x, y), and where $r_L(x,y)$ represents the reconstructed residual sample in the luma component at each position (x, y).

In one such example approach, the new mapping function replaces a default mapping function such as, for example, the existing mapping process specified in the HEVC RExt.

In another example approach, only one scaling parameter (with or without offset) is signaled in the SPS, PPS, or slide header. In one such example approach, the new scaling parameter is used to replace one of the scaling parameters in the set of scaling parameters defined in the current HEVC RExt design (at, for instance, decoded index 164 or 174) and, if desired, is used to scale the reconstructed residual sample of the luma component at each position (x, y).

In another such example, the signaled scaling parameter may simply be used as an additional scaling parameter; it is used without mapping to replace one of the scaling parameters in, for instance, the current HEVC RExt set of scaling parameters. Such an approach can be used, for example, to extend the number of scaling parameters.

In all of the above examples, the signaled mapping function may be applied to both chroma components. Alternatively, a set of mapping parameters are transmitted and used separately for each chroma component.

In one example approach, one of the chroma components may be used in the process described for the luma component above to predict the luma component and the other chroma component.

A change in the mapping process can, in some example approaches, be derived from the residual information of a previously decoded frame. In one example approach, a new mapping function/scaling parameter/offset value is derived from the residual information of a previously coded frame. In some such example approaches, the new mapping function/scaling parameter/offset value is derived from the residual information of the last frame with the same picture type.

In other example approaches, the residual is first classified into several sets, and for each set, one scaling parameter (with or without offset) is derived. In one example, the classification is based on the energy or variance of the residual. In another example, the classification is based on a coding mode. For instance, if the current block is Intra-coded and the new block is Inter-coded (different coding modes), use different scaling parameters and/or offsets.

In one example approach, a decoder determines, based on residual information of a previously coded frame, a value for a scaling parameter $\alpha$ and reconstructs, based on the value of the scaling parameter $\alpha$, a chroma reconstructed residual sample $r_C(x,y)$ for each position (x,y) in a block of video data, wherein $r_C(x,y)=r_C'(x,y)+(\alpha \times r_L(x,y))>>3$, where $r'_c(x,y)$ represents a reconstructed chroma residual sample from the bit-stream at each position (x, y), and where $r_L(x,y)$ represents the reconstructed residual sample in the luma component at each position (x,y).

The techniques described above may be performed by video encoder 20 (FIGS. 1 and 2) and/or video decoder 30 (FIGS. 1 and 3), both of which may be generally referred to as a video coder. In addition, video coding may generally refer to video encoding and/or video decoding, as applicable. While the techniques of this disclosure are generally described with respect to range extension and screen content extension to HEVC, the techniques are not limited in this way. The techniques described above may also be applicable to other current standards or future standards not yet developed.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
receiving a first syntax element for a block of video data, a value of the first syntax element indicating one of a plurality of mapping functions to be used to determine a magnitude of a scaling parameter for cross-component prediction;
receiving a second syntax element for the block of video data, a value of the second syntax element corresponding to the magnitude of the scaling parameter;
decoding the value of the second syntax element with a specific binarization method regardless of the value of the first syntax element;
determining the magnitude of the scaling parameter from a set of scaling parameters using the one of the plurality of mapping functions indicated by the first syntax element and the value of the second syntax element; and
performing cross-component prediction for at least one chroma component of the block of video data using the determined magnitude of the scaling parameter.

2. The method of claim 1, wherein the plurality of mapping functions comprises a first mapping function and a second mapping function,
wherein the first mapping function is defined as ($\alpha$?(1<<($\alpha$−1)): 0), wherein $\alpha$ is the value of the second syntax element, and
wherein the second mapping function is defined as ($\alpha$?(1<<(4−$\alpha$)): 0).

3. The method of claim 1, wherein the plurality of mapping functions comprises a first mapping function and a second mapping function,
wherein the first mapping function is defined as ($\alpha$?(1<<($\alpha$−1)): 0), wherein $\alpha$ is the value of the second syntax element, and
wherein the second mapping function is defined as ($\alpha$?(1<<(5−$\alpha$)): 0).

4. The method of claim 1, further comprising:
receiving a third syntax element for the block of video data, a value of the third syntax element indicating a sign of the scaling parameter,
wherein performing cross-component prediction comprises performing cross-component prediction for the at least one chroma component of the block video data using the magnitude of the scaling parameter and the sign of the scaling parameter.

5. The method of claim 4, further comprising:
determining a context model used to entropy decode the third syntax element based on the mapping function indicated by the first syntax element; and
entropy decoding the third syntax element using the determined context model.

6. The method of claim 1, wherein receiving the first syntax element for the block of video data comprises receiving the first syntax element for the block of video data in at least one of a sequence parameter set, picture parameter set, or slice header.

7. The method of claim 1, wherein the plurality of mapping functions comprises a first mapping function and a second mapping function, the method further comprising:
receiving the first syntax element for the block of video data, the first syntax element indicating the second mapping function; and
receiving the second mapping function for the block of video data in at least one of a sequence parameter set, picture parameter set, or slice header.

8. The method of claim 7, further comprising:
receiving a new scaling parameter for a set of scaling parameters in at least one of a sequence parameter set, picture parameter set, or slice header; and
replacing one scaling parameter of the set of scaling parameters with the new scaling parameter.

9. The method of claim 1, wherein the plurality of mapping functions comprises a first mapping function and a second mapping function, the method further comprising:
receiving the first syntax element for the block of video data, the first syntax element indicating the second mapping function; and
determining the second mapping function from characteristics of residual information of a previously coded video frame, the characteristics comprising one or more of energy of the residual information, variance of the residual information, or coding mode of the information.

10. The method of claim 1, wherein the plurality of mapping functions comprises a first mapping function and a second mapping function, the method further comprising determining the second mapping function based on characteristics of residual information of a previously coded video frame with a same picture type as a frame of the block of video data.

11. A device, comprising:
a memory configured to store video data; and
a video decoder connected to the memory, wherein the video decoder is configured to:
receive a first syntax element for a block of video data, a value of the first syntax element indicating one of a plurality of mapping functions to be used to determine a magnitude of a scaling parameter for cross-component prediction;
receive a second syntax element for the block of video data, a value of the second syntax element corresponding to the magnitude of the scaling parameter;
decode the value of the second syntax element with a specific binarization method regardless of the value of the first syntax element;
determine the magnitude of the scaling parameter from a set of scaling parameters using the one of the plurality of mapping functions indicated by the first syntax element and the value of the second syntax element; and
perform cross-component prediction for at least one chroma component of the block video data using the determined magnitude of the scaling parameter.

12. The device of claim 11, wherein the plurality of mapping functions comprises a first mapping function and a second mapping function,
wherein the first mapping function is defined as ($\alpha$?(1<<($\alpha$−1)): 0), wherein $\alpha$ is the value of the second syntax element, and
wherein the second mapping function is defined as ($\alpha$?(1<<(4−$\alpha$)): 0).

13. The device of claim 11, wherein the plurality of mapping functions comprises a first mapping function and a second mapping function,
wherein the first mapping function is defined as ($\alpha$?(1<<($\alpha$−1)): 0), wherein $\alpha$ is the value of the second syntax element, and
wherein the second mapping function is defined as ($\alpha$?(1<<(5−$\alpha$)): 0).

14. The device of claim 11, wherein the video decoder is further configured to:
   receive a third syntax element for the block of video data, a value of the third syntax element indicating a sign of the scaling parameter,
   wherein to perform the cross-component prediction the video decoder is configured to perform cross-component prediction for the at least one chroma component of the block video data using the magnitude of the scaling parameter and the sign of the scaling parameter.

15. The device of claim 14, wherein the video decoder is further configured to:
   determine a context model used to entropy decode the third syntax element based on the mapping function indicated by the first syntax element; and
   entropy decode the third syntax element using the determined context model.

16. The device of claim 11, wherein to receive the first syntax element for the block of video data the video decoder is configured to receive the first syntax element for the block of video data in at least one of a sequence parameter set, picture parameter set, or slice header.

17. The device of claim 11, wherein the plurality of mapping functions includes a first mapping function and a second mapping function,
   wherein the received first syntax element for the block of video data includes an indication that the second mapping function is to be used to determine the magnitude of the scaling parameter for cross-component prediction for the block of video data, and
   wherein the video decoder is configured to receive the second mapping function in at least one of a sequence parameter set, picture parameter set, or slice header.

18. The device of claim 17, wherein the video decoder is further configured to:
   receive a new scaling parameter for a set of scaling parameters in at least one of a sequence parameter set, picture parameter set, or slice header; and
   replace one scaling parameter of the set of scaling parameters with the new scaling parameter.

19. The device of claim 11, wherein the plurality of mapping functions includes a first mapping function and a second mapping function,
   wherein the received first syntax element for the block of video data includes an indication that the second mapping function is to be used to determine the magnitude of the scaling parameter for cross-component prediction for the block of video data, and
   wherein the video decoder is further configured to determine the second mapping function from characteristics of residual information of a previously coded video frame, the characteristics comprising one or more of energy of the residual information, variance of the residual information, or a coding mode of the information.

20. The device of claim 19, wherein the plurality of mapping functions comprises a first mapping function and a second mapping function, wherein the video decoder is further configured to determine the second mapping function from characteristics of residual information of a previously coded video frame with a same picture type as a frame of the block of video data.

21. A video decoder, comprising:
   means for receiving a first syntax element for a block of video data, a value of the first syntax element indicating one of a plurality of mapping functions to be used to determine a magnitude of a scaling parameter for cross-component prediction;
   means for receiving a second syntax element for the block of video data, a value of the second syntax element corresponding to the magnitude of the scaling parameter;
   means for decoding the value of the second syntax element with a specific binarization method regardless of the value of the first syntax element;
   means for determining the magnitude of the scaling parameter from a set of scaling parameters using the one of the plurality of mapping functions indicated by the first syntax element and the value of the second syntax element; and
   means for performing cross-component prediction for at least one chroma component of the block of video data using the determined magnitude of the scaling parameter.

22. The video decoder of claim 21, wherein the plurality of mapping functions comprises a first mapping function and a second mapping function,
   wherein the first mapping function is defined as ($\alpha$?(1<<($\alpha$−1)): 0), wherein $\alpha$ is the value of the second syntax element, and
   wherein the second mapping function is defined as ($\alpha$?(1<<(4−$\alpha$)): 0).

23. The video decoder of claim 21, wherein the video decoder further comprises:
   means for receiving a third syntax element for the block of video data, a value of the third syntax element indicating a sign of the scaling parameter;
   means for determining a context model used to entropy decode the third syntax element based on the one of the plurality of mapping functions indicated by the first syntax element; and
   means for entropy decoding the third syntax element using the determined context model,
   wherein the means for performing cross-component prediction includes means for performing cross-component prediction for the at least one chroma component of the block video data using the magnitude of the scaling parameter and the sign of the scaling parameter.

24. The video decoder of claim 21, wherein the plurality of mapping functions includes a first mapping function and a second mapping function,
   wherein the received first syntax element for the block of video data includes an indication that the second mapping function is to be used to determine the magnitude of the scaling parameter for cross-component prediction for the block of video data, and
   wherein the video decoder further comprises:
      means for receiving the second mapping function in at least one of a sequence parameter set, picture parameter set, or slice header;
      means for receiving a new scaling parameter for the set of scaling parameters in at least one of a sequence parameter set, picture parameter set, or slice header; and
      means for replacing one scaling parameter of the set of scaling parameters with the new scaling parameter.

25. The video decoder of claim 21, wherein the plurality of mapping functions includes a first mapping function and a second mapping function,
   wherein the received first syntax element for the block of video data includes an indication that the second mapping function is to be used to determine the magnitude of the scaling parameter for cross-component prediction for the block of video data, and wherein the device further comprises:

means for determining the second mapping function from characteristics of residual information of a previously coded video frame, the characteristics comprising one or more of energy of the residual information, variance of the residual information, or a coding mode of the information, wherein the means for determining the second mapping function includes means for determining the second mapping function from characteristics of residual information of a previously coded video frame with a same picture type as a frame of the block of video data.

26. A method of encoding a block of video data, the method comprising:

determining a scaling parameter for cross-component prediction of a block of video data;

selecting a mapping function from a plurality of mapping functions, wherein each mapping function maps the scaling parameter to a mapped value corresponding to a magnitude of the scaling parameter;

signaling, in a video bitstream, a first syntax element, a value of the first syntax element indicating the mapping function selected from the plurality of mapping functions; and signaling, in the video bitstream, a second syntax element, wherein the second syntax element includes the mapped value corresponding to the selected mapping function and wherein signaling a second syntax element includes encoding the value of the second syntax element with a specific binarization method regardless of the value of the first syntax element.

27. The method of claim 26, wherein the plurality of mapping functions includes a first mapping function and a second mapping function, wherein the first mapping function is defined as $(\alpha?(1<<(\alpha-1)): 0)$, wherein $\alpha$ is the value of the second syntax element, and wherein the second mapping function is defined as $(\alpha?(1<<(4-\alpha)): 0)$.

28. The method of claim 26, further comprising:

generating a third syntax element for the block of video data, a value of the third syntax element indicating a sign of the scaling parameter, determining a context model used to entropy decode the third syntax element based on the one of the plurality of mapping functions indicated by the first syntax element; and entropy encoding the third syntax element using the determined context model, wherein performing cross-component prediction includes performing cross-component prediction for at least one chroma component of the block video data using the magnitude of the scaling parameter and the sign of the scaling parameter.

29. The method of claim 26, wherein the plurality of mapping functions includes a first mapping function and a second mapping function, wherein the method further comprises:

signaling, via the first syntax element for the block of video data, an indication that the second mapping function is to be used to determine the magnitude of the scaling parameter for cross-component prediction for the block of video data;

signaling the second mapping function in at least one of a sequence parameter set, picture parameter set, or slice header; and signaling, in at least one of a sequence parameter set, picture parameter set, or slice header, a new scaling parameter for a set of scaling parameters, wherein the new scaling parameter replaces one scaling parameter of the scaling parameters in the set of scaling parameters.

30. The method of claim 26, wherein the plurality of mapping functions includes a first mapping function and a second mapping function, wherein the method further comprises:

determining the second mapping function from characteristics of residual information of a previously coded video frame, the characteristics comprising one or more of energy of the residual information, variance of the residual information, a coding mode of the information, or residual information of a previously coded video frame with a same picture type as a frame of the block of video data.

31. The method of claim 1, wherein the plurality of mapping functions include a set of three or more mapping functions, wherein the value of the first syntax element is an index into the set of mapping functions.

32. The device of claim 11, wherein the plurality of mapping functions include a set of three or more mapping functions, wherein the value of the first syntax element is an index into the set of mapping functions.

33. The video decoder of claim 21, wherein the plurality of mapping functions include a set of three or more mapping functions, wherein the value of the first syntax element is an index into the set of mapping functions.

34. The method of claim 26, wherein signaling the first syntax element includes signaling, as the value of the first syntax element, an index used to select between the plurality of mapping functions.

35. The method of claim 26, wherein signaling the first syntax element includes signaling, as the value of the first syntax element, a flag used to select between two of the mapping functions.

* * * * *